US010176108B2

(12) United States Patent
Nachimuthu et al.

(10) Patent No.: US 10,176,108 B2
(45) Date of Patent: Jan. 8, 2019

(54) ACCESSING MEMORY COUPLED TO A TARGET NODE FROM AN INITIATOR NODE

(71) Applicant: INTEL CORPORATION, Santa Clara, CA (US)

(72) Inventors: Murugasamy K. Nachimuthu, Beaverton, OR (US); Mohan J. Kumar, Aloha, OR (US); Dimitrios Ziakas, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 109 days.

(21) Appl. No.: 15/283,065

(22) Filed: Sep. 30, 2016

(65) Prior Publication Data

US 2018/0095890 A1 Apr. 5, 2018

(51) Int. Cl.
*G06F 12/10* (2016.01)
*G06F 12/06* (2006.01)

(52) U.S. Cl.
CPC .............. *G06F 12/10* (2013.01); *G06F 12/06* (2013.01)

(58) Field of Classification Search
CPC ................................ G06F 12/10; G06F 12/06
USPC ......................................................... 711/202
See application file for complete search history.

(56) References Cited

U.S. PATENT DOCUMENTS

2002/0129186 A1 9/2002 Emerson et al.
2009/0228668 A1* 9/2009 Borkenhagen .......... G06F 12/08 711/161
2010/0235598 A1* 9/2010 Bouvier .............. G06F 12/1483 711/163
2014/0365715 A1 12/2014 Lee
2015/0309742 A1 10/2015 Amidi et al.

FOREIGN PATENT DOCUMENTS

WO 2012015430 2/2012

OTHER PUBLICATIONS

International Search Report and Written Opinion for International Application No. PCT/US2017/049457, dated Dec. 13, 2017, 11 pp.

* cited by examiner

*Primary Examiner* — Hua J Song
(74) *Attorney, Agent, or Firm* — Konrad Raynes Davda & Victor LLP; Rabindranath Dutta

(57) ABSTRACT

Provided are a method, apparatus, and a system in which an initiator node is configured to communicate with a target node that is coupled to a memory. At system initialization time, a memory address map of the initiator node is generated to include addresses corresponding to the memory to which the target node is coupled. The initiator node accesses the memory coupled to the target node, by using the memory address map of the initiator node.

18 Claims, 10 Drawing Sheets

ACCESSING MEMORY COUPLED TO A TARGET NODE FROM AN INITIATOR NODE

BACKGROUND

A dual in-line memory module (DIMM) comprises a series of dynamic random-access memory integrated circuits. Such modules may be mounted on a printed circuit board and may be designed for use in computational devices. A central processing unit (CPU) in a computational device may access the DIMM for performing read or write operations.

Volatile memory is a type of computer memory whose contents are erased when the system's power is turned off or interrupted. For example, dynamic random access memory (DRAM) is a type of volatile memory. Non-volatile memory is a type of computer memory that can retain stored information even after having been power cycled (i.e., turned off and back on). Examples of non-volatile memory includes read-only memory (ROM), flash memory, etc. DIMMs may be comprised of volatile or non-volatile memory.

BRIEF DESCRIPTION OF THE DRAWINGS

Referring now to the drawings in which like reference numbers represent corresponding parts throughout.

DETAILED DESCRIPTION

A computing system may include a CPU complex that is in communication with a plurality of volatile memory DIMMs and a plurality of non-volatile DIMMs. While the data stored in the volatile memory DIMMs is expected to be lost in the event of a power failure or in the event of a replacement of the CPU complex, the data stored in the non-volatile memory DIMMs is expected to be retained in the event of a power failure or in the event of a replacement of the CPU complex.

In certain computing systems in which the memory provided by the volatile memory DIMMs and the non-volatile memory DIMMs are intermixed, the computing systems may become harder to service even though a higher performing computing system may be achieved via the intermixing of the DIMMs. For example, interleaving of memory that spreads memory addresses evenly across memory banks may require such DIMMs to be replaced in a specific order after removal of the DIMMs, where the removal and replacement of the DIMMs may be necessitated by replacement of components such as a CPU complex of the computing system.

In order to make it easier to service such computing systems, in certain embodiments, volatile memory DIMMs and non-volatile memory DIMMs are mechanically separated from the CPU complex by coupling the volatile memory DIMMs and the non-volatile memory DIMMs to a fabric memory expander and by coupling the fabric memory expander to the CPU complex via a fabric. In such embodiments, the replacement of components, such as a CPU complex, may be performed without removal and replacement of the DIMMs.

In the following description, reference is made to the accompanying drawings which form a part hereof and which illustrate several embodiments. It is understood that other embodiments may be utilized and structural and operational changes may be made.

Figure 1:
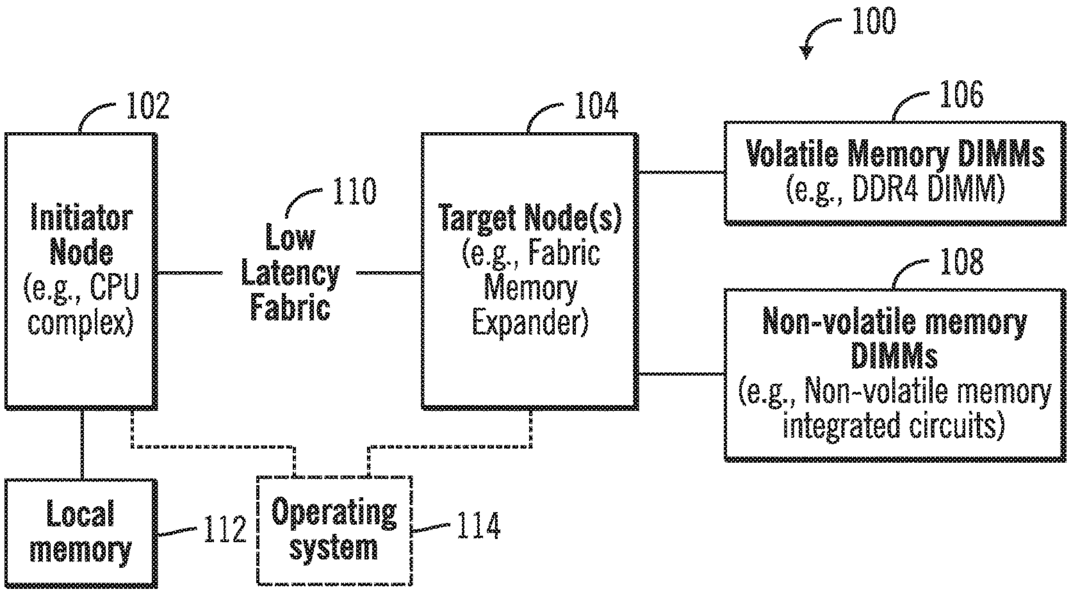
FIG. 1 illustrates a block diagram of a computing environment in which an initiator node is coupled to a target node, where both volatile memory DIMMs and non-volatile memory DIMMs are coupled to the target node, in accordance with certain embodiments.

FIG. 1 illustrates a block diagram of a computing environment 100 in which an initiator node 102 is coupled to a target node 104, where both volatile memory DIMMs 106 and non-volatile memory DIMMs 108 are coupled to the target node 104, in accordance with certain embodiments. In certain embodiments, the initiator node 102 may be coupled to more than one target node. While FIG. 1 shows the volatile and non-volatile DIMMs separately, in certain embodiments a single DIMM may include both volatile and non-volatile memory.

In certain embodiments, the initiator node 102 may comprise a CPU complex comprising one or more cores. The initiator node 102 may be coupled via a low latency fabric 110 to the target node 104, where the target node 104 may be a fabric memory expander.

Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in a memory module (for example, a DIMM) is synchronous dynamic random access memory (SDRAM). In certain embodiments, the volatile memory DIMMs 106 may be comprised of double data rate version 4 (DDR4) DIMMs or any other type of volatile memory technologies. In particular embodiments, DRAM of the volatile memory DIMMs 106 complies with a standard promulgated by JEDEC, such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at www.jedec.org). Such standards (and similar standards) may be referred to as DDR-based standards. The volatile memory DIMMs 106 may be in certain embodiments be comprised of other versions of DDR memory, including DDR memory based on future versions of JEDEC DDR standards.

The non-volatile memory DIMMs 108 may in certain embodiments be comprised of non-volatile memory integrated circuits, where a non-volatile memory is a storage medium that does not require power to maintain the state of data stored by the storage medium. In certain embodiments, the non-volatile memory DIMMs 108 are electronically compatible and pin-compatible with DDR4, whereas in other embodiments the non-volatile memory DIMMs 108 need not be pin-compatible with DDR4 or other technologies and may be based on a different form factor than DDR4 or other technologies. In certain embodiments the non-volatile memory DIMMs 108 may be comprised of a Triple Level Cell (TLC) NAND or any other type of NAND [e.g., Single Level Cell (SLC), Multi Level Cell (MLC), Quad Level Cell (QLC), etc.] or any other type of non-volatile memory complex. In other embodiments the non-volatile memory DIMMs 108 may be comprised certain other types of non-volatile memory, such as NOR memory or some other suitable non-volatile memory. Nonlimiting examples of non-volatile memory may include any or a combination of: solid state memory [such as planar or three Dimensional (3D) NAND flash memory or NOR flash memory], storage devices that use chalcogenide phase change material (e.g., chalcogenide glass), byte addressable nonvolatile memory devices, ferroelectric memory, silicon-oxide-nitride-oxide-silicon (SONOS) memory, polymer memory (e.g., ferroelectric polymer memory), three dimensional (3D) crosspoint memory, ferroelectric transistor random access memory (Fe-TRAM) ovonic memory, nanowire memory, electrically erasable programmable read-only memory (EEPROM), other various types of non-volatile random access memories (RAMs), and magnetic storage memory. In some embodiments, the 3D crosspoint memory may comprise a transistor-less stackable cross point architecture in which memory cells sit at the intersection of words lines and bit lines and are individually addressable and in which bit storage is based on a change in bulk resistance. In certain embodiments, a DIMM with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at wwwjedec.org).

The initiator node 102 may also have local memory 112 coupled to the initiator node, where the local memory may be volatile memory that is relatively small in size in comparison to the memory made available to the initiator node 102 via the volatile memory DIMMs 106 and non-volatile memory DIMMs 108. The non-volatile memory DIMMs 108 may act as a remote non-volatile memory and the volatile memory DIMMs 106 may act as a remote volatile memory for the initiator node 102, in contrast to the local memory 112 of the initiator node 102.

In certain embodiments, the initiator node 102 or the initiator node 101 in combination with the target node 104 may be comprised of any suitable computational device, such as a personal computer, a mainframe, a telephony device, a smart phone, a storage controller, a blade computer, a processor with memory, etc. The initiator node 102 may be referred to as a host, a host computing system or as a computational device. In addition to or instead of using the fabric 110, the initiator node 102 may communicate with the target node 104 over a bus (such as Peripheral Component Interconnect (PCIe), Serial Advanced Technology Attachment (SATA), Serial Attached Small Computer System Interface (SAS)) or a network, such as the Internet, a storage area network (SAN), a local area network (LAN), etc. Further details of the SATA specification may be found in the publication titled "Serial ATA Specification, Revision 3.2," released August 2013, by SATA International Organization (SATA-IO), Beaverton, OR. In another example, the interface and/or interconnect protocols for communication between the initiator node 102 and the target node 104 may comply and/or be compatible with an NVMe (Non-Volatile Memory Host Controller Interface Express). Further details of NVMe may be found in the publication titled "NVM Express™, Revision 1.2," released Nov. 3, 2014 by NVM Express™ Work Group, and/or earlier and/or later versions of this specification (NVM Express is a trademark of NVM Express, Inc.).

In certain embodiments, an operating system 114 may execute in the computing environment 100, wherein the operating system 114 may be used to control operations performed by the initiator node 102 and the control node 104.

Figure 2:
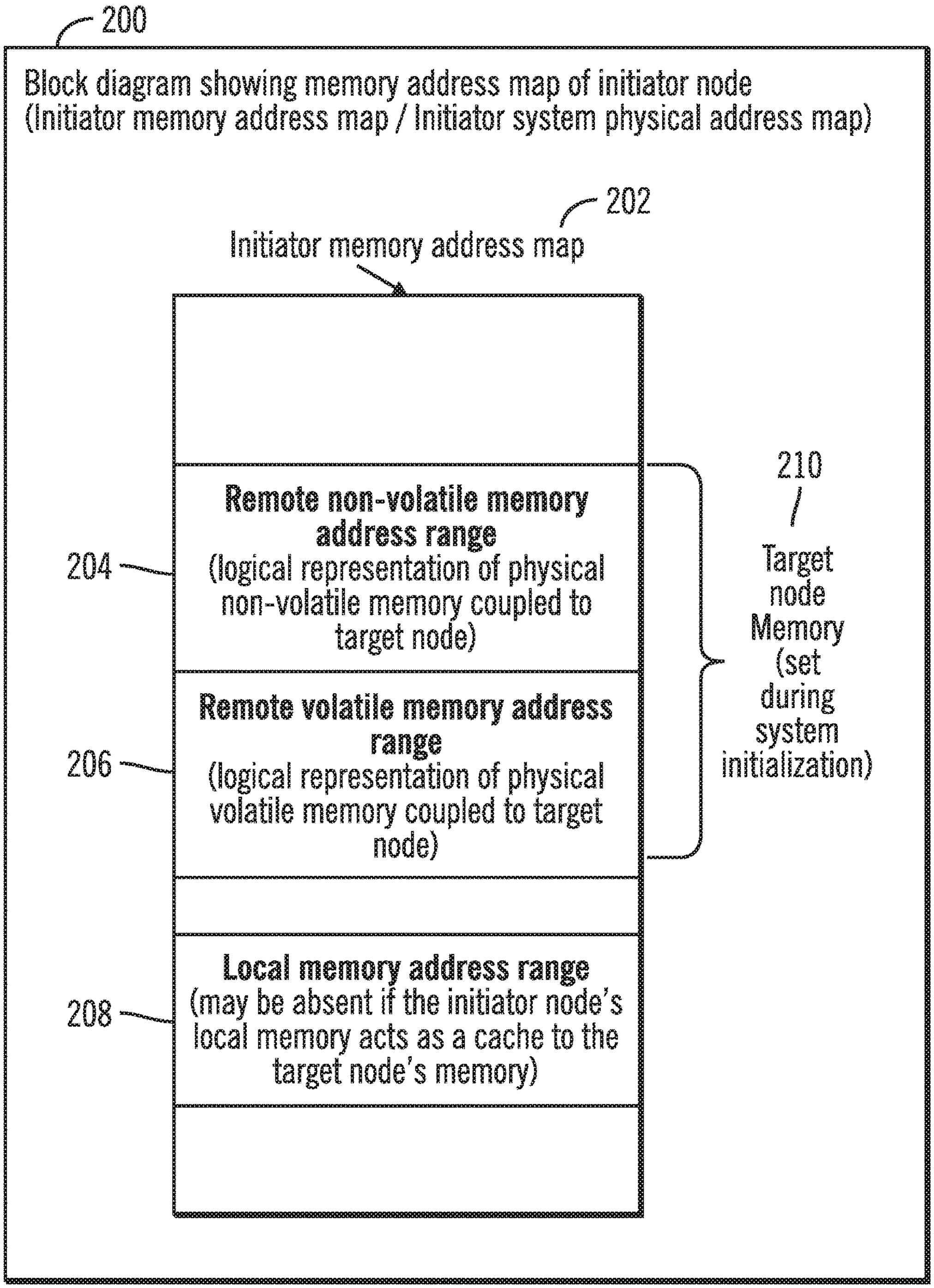
FIG. 2 illustrates a block diagram that shows a memory address map of the initiator node, in accordance with certain embodiments.

FIG. 2 illustrates a block diagram 200 that shows a memory address map 202 of the initiator node 102, in accordance with certain embodiments. The memory address map 202 of the initiator node 102 shows the address space of memory available to the initiator node 102.

The memory address map 202 includes a range of addresses referred to as the remote non-volatile memory address range 204 that is a logical representation of physical non-volatile memory coupled to the target node 104, where the physical non-volatile memory is provided by the non-volatile memory DIMMs 108 coupled to the target node 104.

The memory address map 202 also includes a range of addresses referred to as the remote volatile memory address range 206 that is a logical representation of physical volatile memory coupled to the target node 104, where the physical volatile memory is provided by the volatile memory DIMMs 106 coupled to the target node 104.

Additionally, the memory address map 202 also includes a range of addresses referred to as the local memory address range 208 that is a logical representation of physical local memory 112 coupled to the initiator node 102. In certain embodiments, the initiator node's local memory may act as a cache to the target node's memory, and in such embodiments, the local memory address range 208 may not be present as part of the initiator memory address map 202.

It should be noted that the remote non-volatile memory address range 204 and the remote volatile memory address range 206 together represent the memory provided by the target node 104 to the initiator node 102, and the memory that is provided by the target node 104 to the initiator node 102 is referred to as target node memory 210. The target node memory 210 is set in the memory address map 202 during system initialization, where system initialization is the process of initializing the initiator node 102 during bootup, during which the initiator node 102 establishes communications with the target node 104. In certain embodiments, in which the initiator node 102 is coupled to a plurality of target nodes, the initiator node 102 may provide support to the plurality of target nodes via the initiator memory address map 202.

Figure 3:
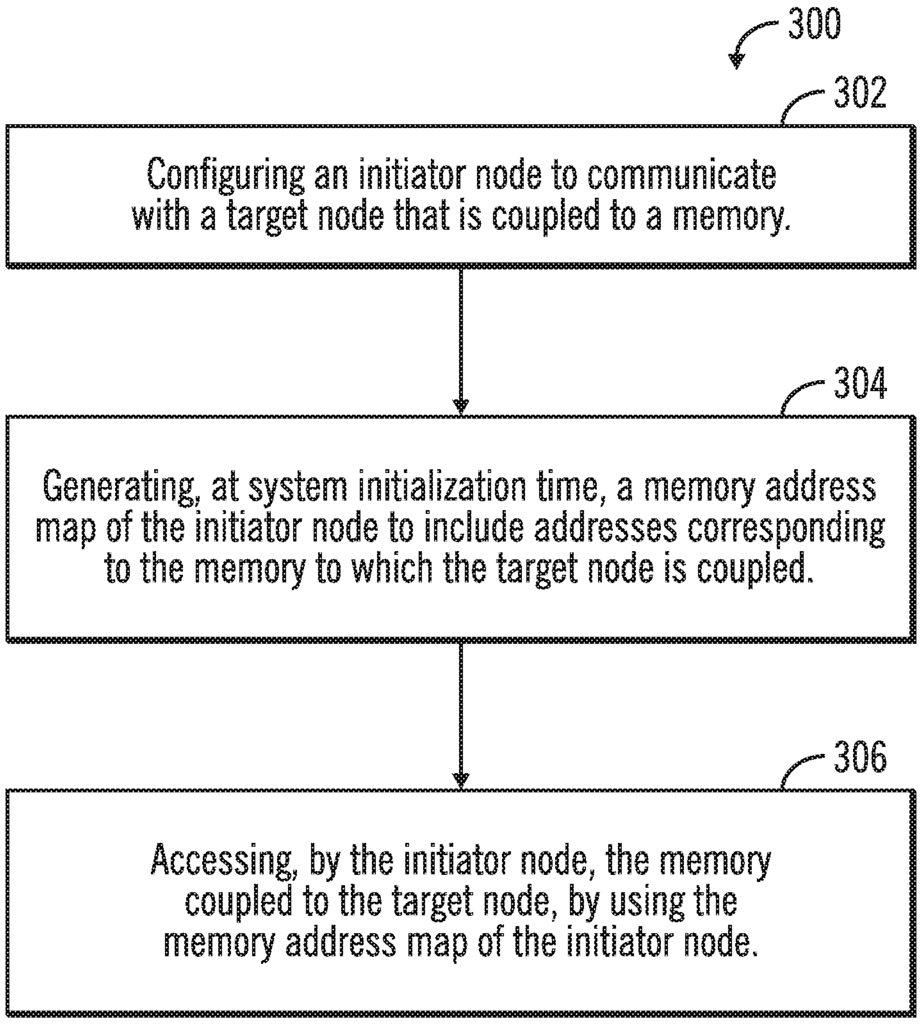
FIG. 3 illustrates a flowchart that shows operations performed by the initiator node, in accordance with certain embodiments.

FIG. 3 illustrates a flowchart 300 that shows operations performed by the initiator node 102, in accordance with certain embodiments.

Control starts at block 302 in which, the initiator node 102 is configured to communicate with the target node 104 that is coupled to a memory (e.g., the volatile memory DIMMs 104 and/or the non-volatile memory DIMMs 108). At system initialization time, a memory address map 202 of the initiator node 102 is generated (at block 304) to include addresses corresponding to the memory to which the target node 104 is coupled. The initiator node 102 accesses (at block 306) the memory coupled to the target node 104, by using the memory address map 202 of the initiator node 102.

In certain embodiments, hot plugging of the target node 104 may be supported in the computing environment 100, where hot plugging is the addition of a component to a running computer system without significant interruption to the operation of the computer system and the hot plugging of the component does not require a restart of the computer system. In such embodiments, when the target node 104 is hot plugged, the initiator node 102 may configure and/or update the initiator memory address map 202 during runtime, and notify the configured and/or updated initiator memory address map 202 to the operating system 114. In certain embodiments, DIMM interfaces or a management controller such as a baseboard management controller (BMC) may be used to notify the operating system 114 that a new memory is available, where the new memory is provided by the target node 104.

Figure 4:
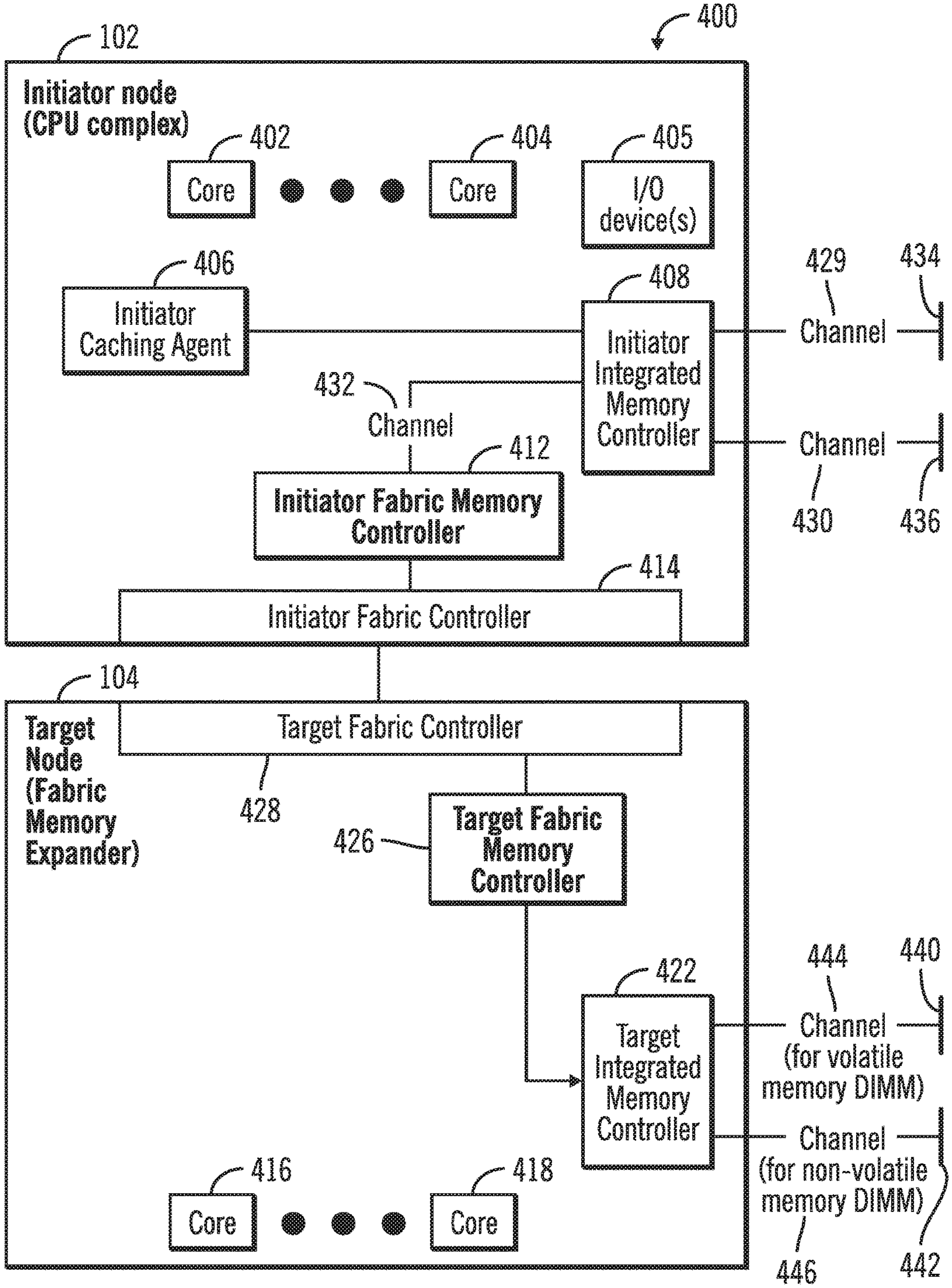
FIG. 4 illustrates a block diagram that shows components of the initiator node and the target node, in accordance with certain embodiments.

FIG. 4 illustrates a block diagram 400 that shows components of the initiator node 102 and the target node 104, in accordance with certain embodiments.

The initiator node 102 may comprise a multi-core processor that is comprised of a plurality of cores 402, 404, where a core is an independent processing unit that reads and executes program instructions. The initiator node may also include one or more I/O devices 405. The initiator node 102 may include a plurality of components that are built in hardware (or alternatively via a combination of hardware, software, and/or firmware), where the plurality of components include a caching agent 406, an integrated memory controller 408 (it should be noted that in certain embodiments a memory controller that is not integrated may be used instead of the integrated memory controller 408), a fabric memory controller 412, and a fabric controller 414. The caching agent 406, the integrated memory controller 408, the fabric memory controller 412, and the fabric controller 414 may also be referred to as an initiator caching agent 406, an initiator integrated memory controller 408, an initiator fabric memory controller 412, and an initiator fabric controller 414 respectively. In certain embodiments the caching agent 406 may not be present if there is only a single integrated memory controller, as the caching agent 406 may determine which of a plurality of integrated memory controllers to forward a request to, if there are more than one integrated memory controllers in the initiator node 402. In certain embodiments instead of having the integrated memory controller 108 internally within the initiator node 102, the integrated memory controller 408 may be external to the initiator node 102. While a plurality of components 406, 408, 412, 414 of the initiator node 102 are shown in different blocks, in alternative embodiments the functions performed by one or more of the plurality of components 406, 408, 412, 414 may be performed by a single component.

The target node 104 may comprise a fabric memory expander that is comprised of a plurality of cores 416, 418. The target node 104 may also include a plurality of components that are built in hardware (or alternatively via a combination of hardware, software, and/or firmware), where the plurality of components comprise an integrated memory controller 422, a fabric memory controller 426, and a fabric controller 428. The integrated memory controller 422, the fabric memory controller 426, and the fabric controller 428 are also referred to as a target integrated memory controller 422, a target fabric memory controller 426, and a target fabric controller 428 respectively. While a plurality of components 422, 426 of the target node 104 are shown in different blocks, in alternative embodiments the functions performed by one or more of the plurality of components 422, 426 may be performed by a single component.

The integrated memory controller 408 of the initiator node 102 is shown to have three channels 429, 430, 432, where channels 429, 430 are used to communicate with local memory 112 included in DIMM slots 434, 436, and channel 432 is used to communicate with the fabric memory controller 412 of the initiator node 102, where the fabric memory controller 412 of the initiator node 102 communicates with the target node 104 via the fabric controller 414 of the initiator node 102 to access the memory of the volatile memory DIMM and non-volatile memory DIMMs placed in slots 440, 442 that are coupled to the integrated memory controller 422 of the target node 104. The integrated memory controller 422 of the target node 104 communicates via channel 444 with the volatile memory DIMM 106 placed in slot 440, and via channel 446 with the non-volatile memory DIMM 108 placed in slot 442.

Figure 5:
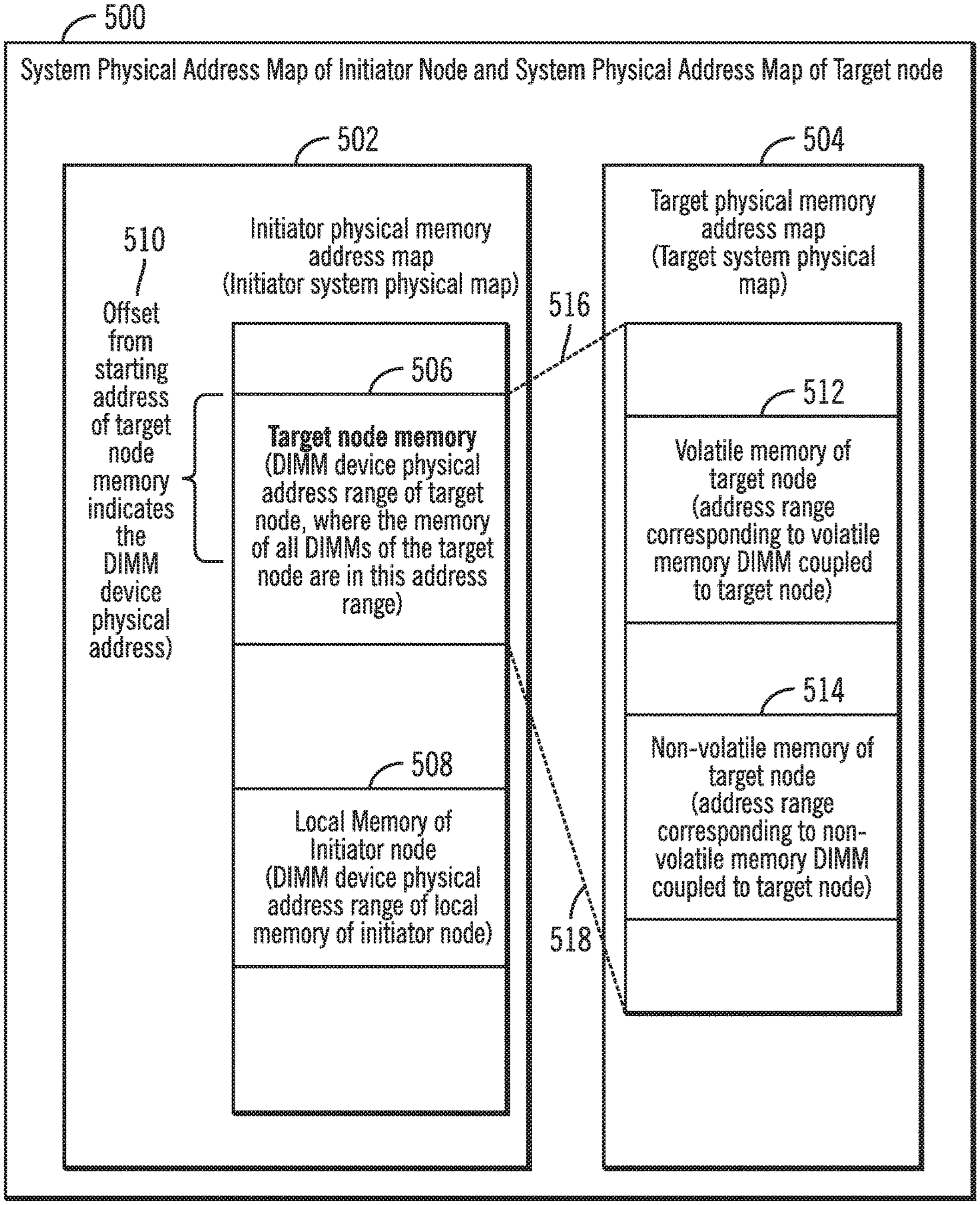
FIG. 5 illustrates block diagram that shows a system physical address map of the initiator node and a system physical address map of the target node, in accordance with certain embodiments.

FIG. 5 illustrates block diagram 500 that shows a system physical address map 502 of the initiator node 102 and a system physical address map 504 of the target node 104, in accordance with certain embodiments. The system physical address map 502 of the initiator node 102 is also referred to as an initiator physical memory address map or an initiator system physical map. The physical address map 504 of the target node 102 is also referred to as a target physical memory address map or a target system physical map.

The physical memory address map 502 of the initiator node 102 is analogous to that described in block 200 of FIG. 2. The physical memory address map 502 of the initiator node 102 includes addresses for the target node memory (shown via reference numeral 506) and addresses for the local memory of the initiator node (shown via reference numeral 508). The target node memory 506 corresponds to the DIMM device physical address of the target node 104, where the memory of all DIMMs of the target node 104 are in the range of addresses for the target node memory 506. The local memory of the initiator node (reference numeral 508) corresponds to the DIMM device physical address range of local memory of the initiator node 102. An offset 510 from the starting address of the target node memory 504 indicates the DIMM device physical address.

The physical memory address map 504 of the target node 104 includes addresses for the volatile memory of the target node (shown via reference numeral 512) and the address of the non-volatile memory of the target node (shown via reference numeral 514) and they include address ranges corresponding to the volatile memory DIMM 106 and the non-volatile memory DIMM 108 respectively.

Therefore, the physical memory address map 502 of the initiator node 102 includes address for the memory of the target node 104, and the physical memory address map 504 of the target node 104 includes the addresses of the volatile and non-volatile memory coupled to the target node 104. The dashed lines 516, 518 show how a target node's memory address range becomes part of the initiator node's memory address map.

The initiator node 102 may secure information on the memory size of the target node 104 and the type of memory of the target node 104, via a variety of mechanisms in different computing environments. In certain embodiments, the initiator node's baseboard management controller (BMC) may communicate with the target node's BMC to secure the information on the memory size and type of memory of the target node 102. In another embodiment, a pod manager (PODM) in a rack scale design architecture may communicate with the pooled system management engine (PSME) and/or BMC of the target node 104 and provide the memory map information to the initiator node 102 via the BMC or PSME of the initiator node 102. In yet another embodiment, a system management bus (SMBus) connection between the initiator node 102 and the target node 104 may be used to secure the memory size and type of memory of the target node 104. In another embodiment, the target node 104 may submit its information on the memory size and type of memory to a predetermined network storage and the initiator node 102 may read the information from the predetermined network storage. In other embodiments, the target node 104 may itself allocate a memory region. For example, if the target node 104 uses a target system memory range from a representative region labeled as a "2 GB-1 MB region" to a representative region labeled as a "2 GB region" to contain the memory ranges and memory types (volatile or persistent), then the initiator node 102 may temporarily set aside a 2 GB memory region and communicate with the "2 GB-1 MB region" to the "2 GB region" of the target node 104 to secure the target memory map settings and reconfigure the initiator node's memory address ranges to cover the target node's memory address ranges.

Figure 6:
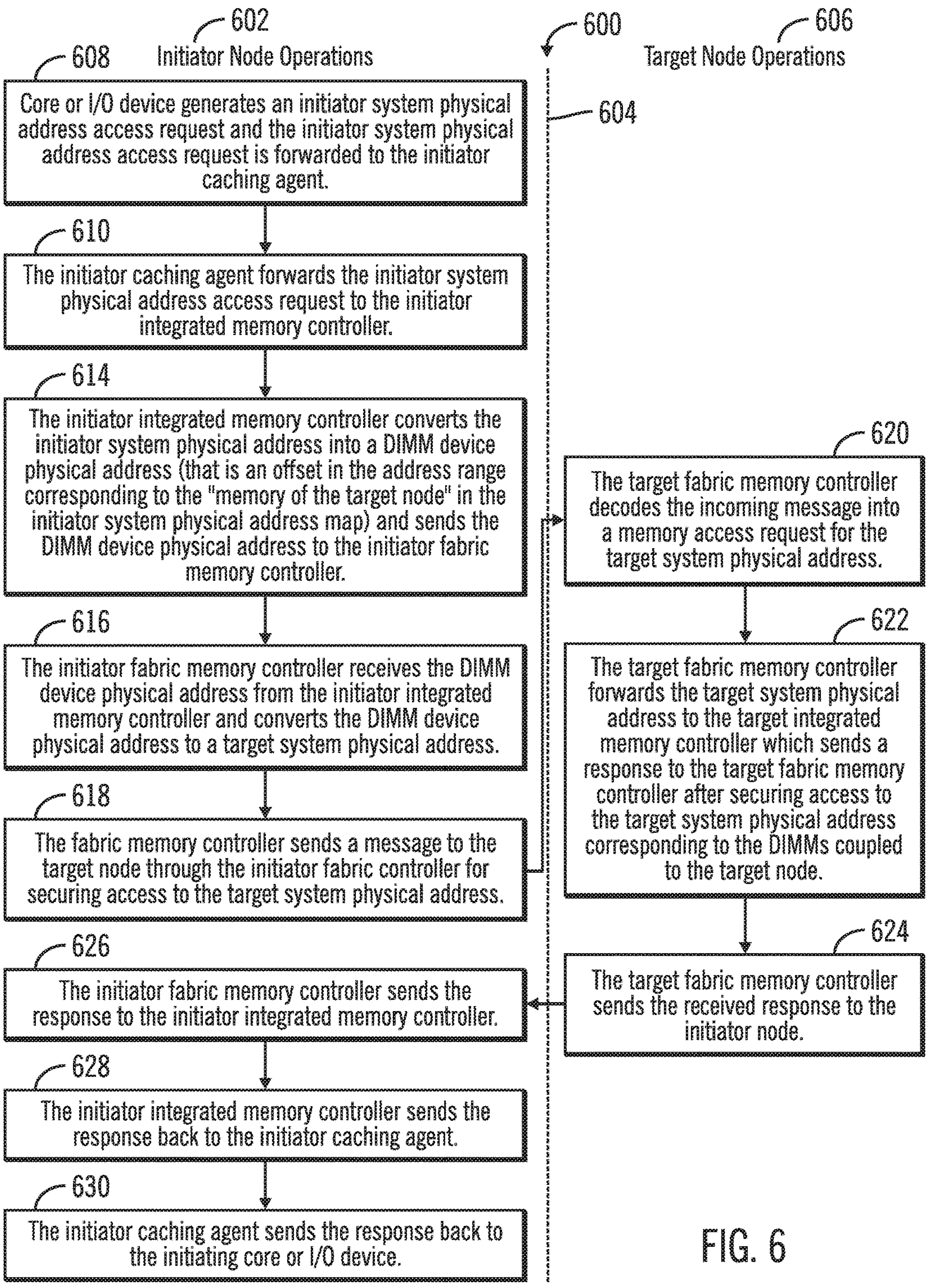
FIG. 6 illustrates a flowchart that shows operations performed by the initiator node and the target node, in accordance with certain embodiments.

FIG. 6 illustrates a flowchart 600 that shows operations performed by the initiator node 102 and the target node 104, in accordance with certain embodiments. In FIG. 6, the initiator node operations 602 that are performed by the initiator node 102 are shown to the left of the dashed line 604, and the target node operations 606 that are performed by the target node 104 are shown to the right of the dashed line 604.

Control starts at block 608 in which a core 402 or an I/O device 405 generates a system physical address access request and the system physical address request is sent to initiator caching agent 406. The initiator caching agent 406 forwards (at block 610) the system physical address request to the initiator integrated memory controller 408.

The initiator integrated memory controller 408 converts (at block 614) the system physical address request into a DIMM device physical address (that is an offset 510 in the address range corresponding to the "memory of the target node" in the initiator physical memory address map) and sends the DIMM device physical address to the initiator fabric memory controller 412. The initiator fabric memory controller 412 receives the DIMM device physical address from the initiator integrated memory controller 408 and converts (at block 616) the DIMM device physical address to the system physical address of the target node 104. The system physical address range of the target node may be retrieved via a management controller or by dedicating a system physical address range in the target node 104, or by sending a target system configuration read request. If multiple integrated memory controller channels or initiator integrated memory controllers are used to increase bandwidth, the target node's system physical address range may be divided among the initiator integrated memory controllers.

Control proceeds to block 618 in which the initiator fabric memory controller 412 sends a system physical address access request to the target node 104 through the fabric controller 414. The target fabric memory controller 426 decodes (at lock 620) the incoming message into a memory access request for the target system physical address.

Control proceeds to block 622 in which the target fabric memory controller 426 forwards the target system physical address to the target integrated memory controller 422 which sends a response to the target fabric memory controller 426 after securing access to the target system physical address corresponding to the DIMMs coupled to the target node 104. The target fabric memory controller 426 then sends (at block 624) the received response to the initiator node 102.

On receiving the system physical address response at the initiator node 102 via the fabric controller 414, the initiator fabric memory controller 412 sends (at block 626) the system physical address response back to the initiator integrated memory controller 408. The initiator integrated memory controller 408 sends (at block 628) the system physical address response back to the initiator caching agent 406. The initiator caching agent 406 sends (at block 630) the system physical address response back to the initiating core 402 or I/O device 405.

Therefore FIGS. 1-6 illustrate certain embodiments in which an initiator fabric memory controller 412 acts as a messenger to convert an initiator node's 102 system physical address to the target node's 104 system physical address and sends the message to the target node 104. In the target node 104, target fabric memory controller 426 decodes the system physical address access request and performs a memory access to the system physical address of the target node 104. The resulting response is sent back to the initiator node's 102 initiator fabric memory controller 412.

Figure 7:
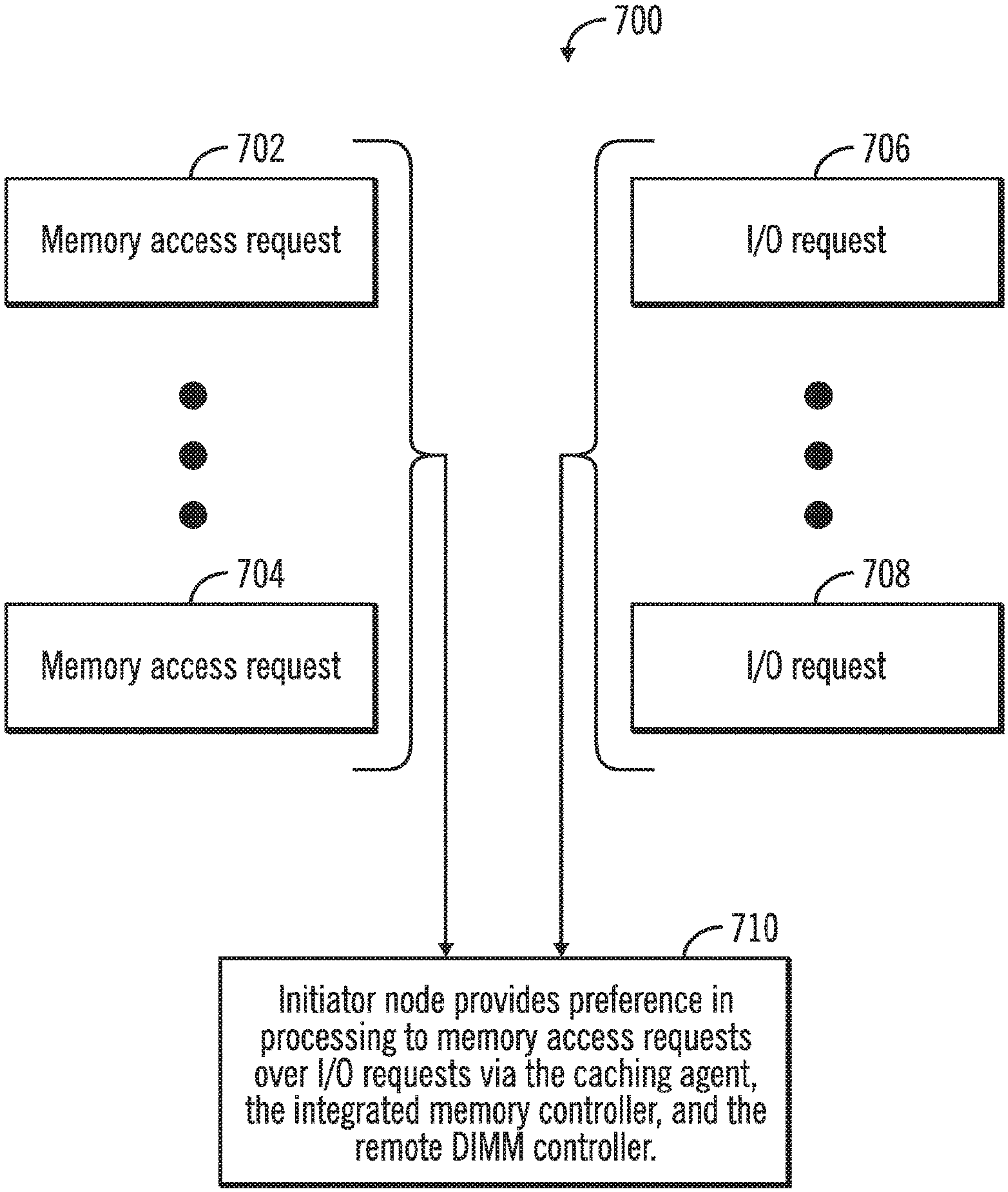
FIG. 7 illustrates a block diagram that shows a preference in processing being provided to memory access requests over input/output (I/O) access requests, in accordance with certain embodiments.

FIG. 7 illustrates a block diagram 700 that shows the initiator node 102 providing preferential processing to memory access requests over input/output (I/O) access requests, in accordance with certain embodiments.

A plurality of memory access requests 702, 704 and a plurality of I/O requests 706, 708 may be generated for the initiator node 102. Since I/O requests can generally wait while memory requests need to be serviced as soon as possible, the initiator node 102 provides preference in processing to the memory access requests 702 over the I/O requests 706, 708, via the caching agent 406, the integrated memory controller 408, and the initiator fabric memory controller 412.

Figure 8:
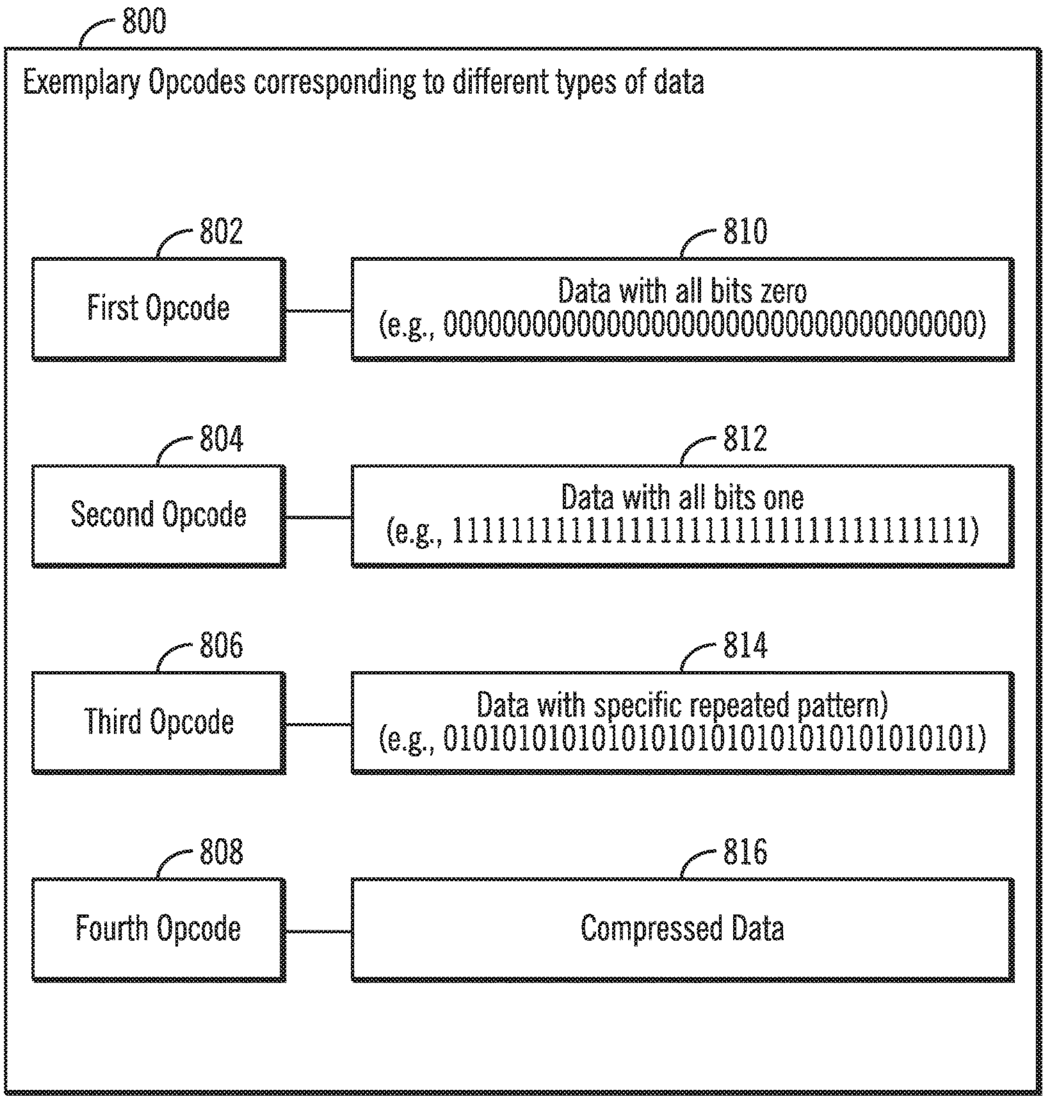
FIG. 8 illustrates a block diagram that shows exemplary opcodes corresponding to different types of data, in accordance with certain embodiments.

FIG. 8 illustrates a block diagram 800 that shows exemplary opcodes corresponding to different types of data, in accordance with certain embodiments. An opcode is the portion of a machine language instruction that specifies an operation to be performed. Beside the opcode itself, most machine language instructions also specify the data they will process, in the form of operands.

Four exemplary opcodes 802, 804, 806, 808 are shown in FIG. 8. Opcode 802 is used to indicate data having all bits set to zero (reference numeral 810). Opcode 804 is used to indicate data having all bits set to one (reference numeral 812). Opcode 806 is used to indicate data with specific repeated patterns such as a repeated "01" pattern (reference numeral 814). Opcode 808 is used to indicate data that is compressed (reference numeral 816). The initiator node 102 and the target node 104 interpret the opcodes to reduce the number of operations needed to read or write data.

For example, in certain embodiments when an address is sent and followed by 64 bytes of data, then by using the exemplary opcodes 802, 804, 806 that are used for all zeros, all ones, or repeated patterns, the entire 64 bytes of data does not have to be sent. Additionally, if the opcode 808 indicates that compressed data is included in the 64 bytes of data, then when the compressed data is uncompressed more than 64 bytes of data is received. As a result, the overall read and write time are improved over systems that do not include such exemplary opcodes.

Figure 9:
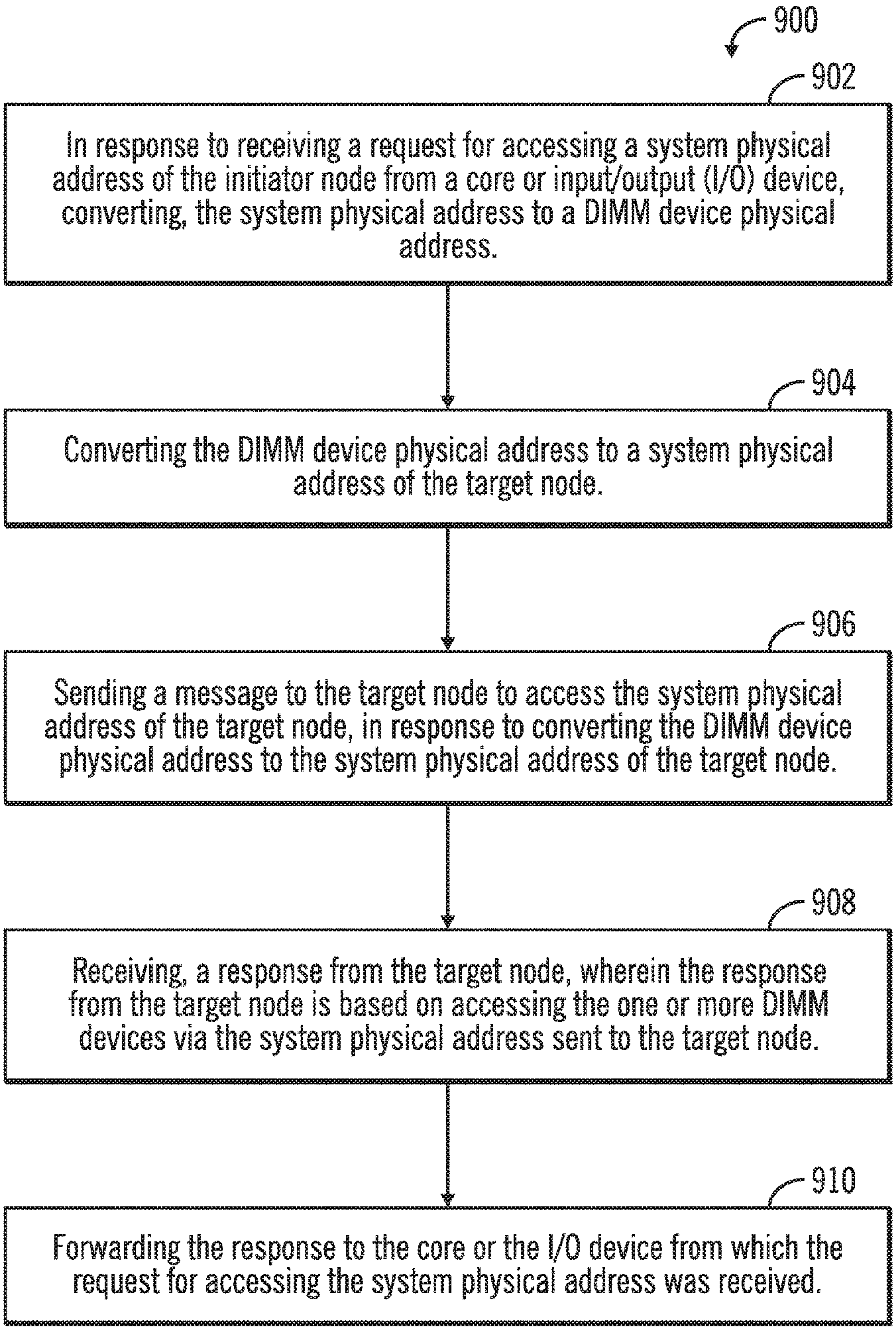
FIG. 9 illustrates a flowchart that shows operations performed by a controller included within the initiator node, in accordance with certain embodiments.

FIG. 9 illustrates a flowchart 900 that shows operations performed by the initiator fabric memory controller 412 included within the initiator node 102, in accordance with certain embodiments.

Control starts at block 902 in which in response to receiving a request for accessing a system physical address of the initiator node 102 from a core or I/O device, the initiator node 102 converts the system physical address to a DIMM device physical address. Control proceeds to block 904 in which the initiator node 102 converts the DIMM device physical address to a system physical address of the target node 104. The initiator node 102 sends (at block 906) a message to the target node 104 to access the system physical address of the target node, in response to converting the DIMM device physical address to the system physical address of the target node 104.

The initiator node 102 receives (at block 908) a response from the target node 104, wherein the response from the target node 104 is based on accessing the one or more DIMM devices 106, 108 via the system physical address sent to the target node 104. The response is forwarded (at block 910) to the core or the I/O device from which the request for accessing the system physical address was received.

Therefore, FIGS. 1-9 illustrate certain embodiments in which an initiator node 102 accesses the volatile and non-volatile memory DIMMs that are coupled to a target node 104. Preference is provided to memory accesses over I/O accesses. Additionally, specialized opcodes are used for communication certain data patterns and for compressed data.

The described operations may be implemented as a method, apparatus or computer program product using standard programming and/or engineering techniques to produce software, firmware, hardware, or any combination thereof. The described operations may be implemented as code maintained in a "computer readable storage medium", where a processor may read and execute the code from the computer storage readable medium. The computer readable storage medium includes at least one of electronic circuitry, storage materials, inorganic materials, organic materials, biological materials, a casing, a housing, a coating, and hardware. A computer readable storage medium may comprise, but is not limited to, a magnetic storage medium (e.g., hard drive drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmission signals. Those skilled in the art will recognize that many modifications may be made to this configuration, and that the article of manufacture may comprise suitable information bearing medium known in the art.

Computer program code for carrying out operations for aspects of the certain embodiments may be written in any combination of one or more programming languages. Blocks of the flowchart and block diagrams may be implemented by computer program instructions.

Figure 10:
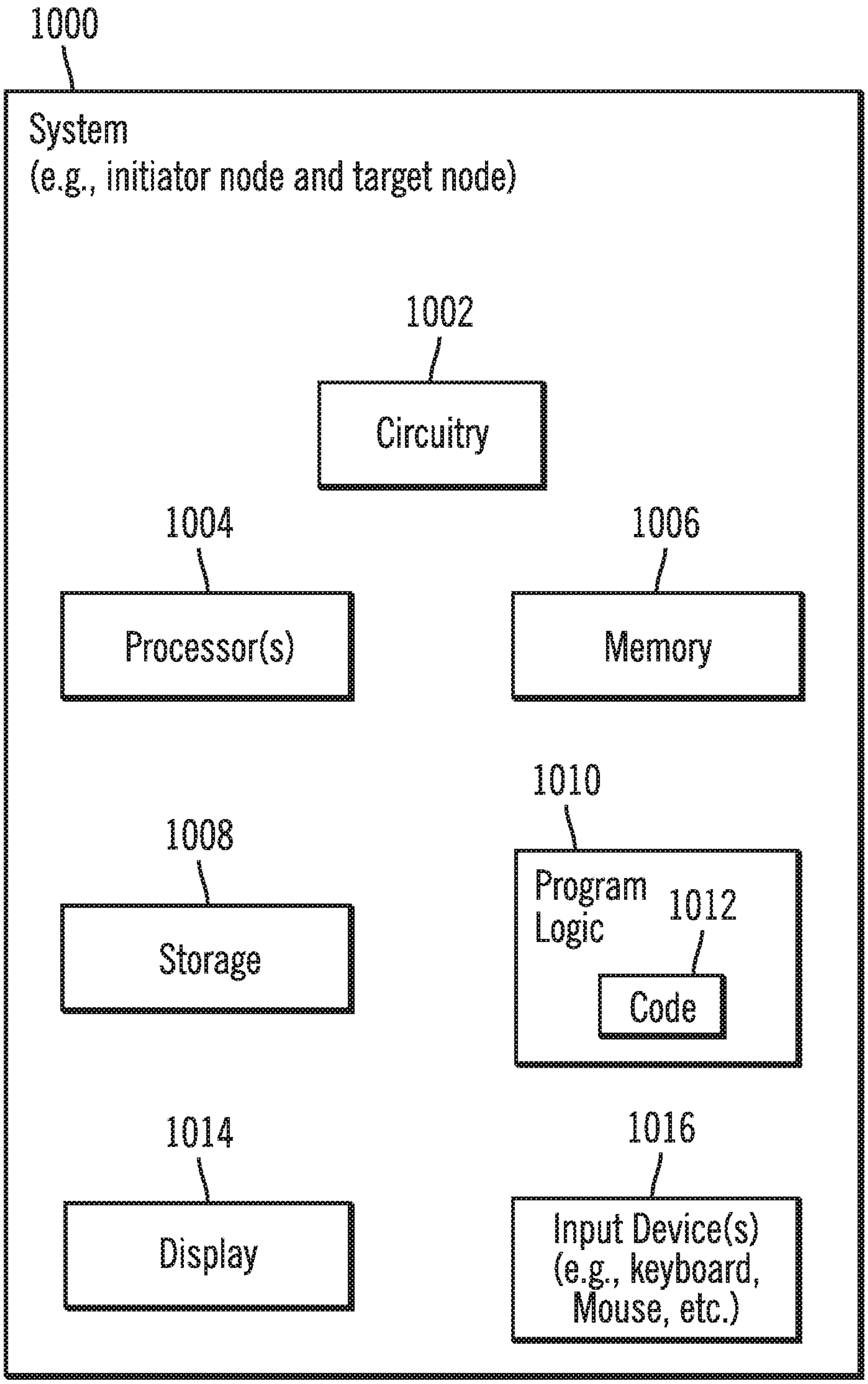
FIG. 10 illustrates a block diagram of a device comprising the initiator node and the target node, in accordance with certain embodiments.

FIG. 10 illustrates a block diagram of a system 1000 that includes both the initiator node 102 and the target node 104, in accordance with certain embodiments. For example, in certain embodiments the system 1000 may be a computer (e.g., a laptop computer, a desktop computer, a tablet, a cell phone or any other suitable computational device) that has the initiator node 102 and the target node 104 both included in the system 1000. For example, in certain embodiments the system 1000 may be a computer with a plurality of racks where each rack includes the initiator node 102, the target node 104, the volatile memory DIMMs 106, and the non-volatile memory DIMMs 108. The system 1000 may include a circuitry 1002 that may in certain embodiments include at least a processor 1004. The system 1000 may also include a memory 1006 (e.g., a volatile memory device), and storage 1008. The storage 1008 may include the solid state drive 102 or other drives or devices including a non-volatile memory device (e.g., EEPROM, ROM, PROM, flash, firmware, programmable logic, etc.). The storage 1008 may also include a magnetic disk drive, an optical disk drive, a tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. Therefore, while FIG. 10 shows the program logic 1010 separately from the other elements, the program logic 1010 may be implemented in the memory 1006 and/or the circuitry 1002. The system 1000 may also include a display 1014 (e.g., an liquid crystal display (LCD), a light emitting diode (LED) display, a cathode ray tube (CRT) display, a touchscreen display, or any other suitable display). The system 1000 may also include one or more input devices 1016, such as, a keyboard, a mouse, a joystick, a trackpad, or any other suitable input devices). Other components or devices beyond those shown in FIG. 10 may also be found in the system 1000.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to be limited to the precise forms disclosed. Many modifications and variations are possible in light of the above teaching.

EXAMPLES

The following examples pertain to further embodiments.

Example 1 is a method for accessing memory. An initiator node is configured to communicate with a target node that is coupled to a memory. At system initialization time, a memory address map of the initiator node is generated to include addresses corresponding to the memory to which the target node is coupled. The initiator node accesses the memory coupled to the target node, by using the memory address map of the initiator node.

In example 2, the subject matter of example 1 may include that the memory that is coupled to the target node includes at least one of a volatile memory and a non-volatile memory.

In example 3, the subject matter of example 2 may include that the volatile memory and the non-volatile memory are included in one or more dual inline memory module (DIMM) devices, wherein the addresses corresponding to the memory to which the target node is coupled comprises DIMM device physical addresses, and wherein the example further comprises: in response to receiving a request for accessing a system physical address of the initiator node from a core or input/output (I/O) device, converting, the system physical address to a DIMM device physical address; converting the DIMM device physical address to a system physical address of the target node; and sending a message to the target node to access the system physical address of the target node, in response to converting the DIMM device physical address to the system physical address of the target node.

In example 4, the subject matter of claim 3 may include receiving, a response from the target node, wherein the response from the target node is based on accessing the one or more DIMM devices via the system physical address sent to the target node; and forwarding the response to the core or the I/O device from which the request for accessing the system physical address was received.

In example 5, the subject matter of example 2 may include that in response to a hot plugging of the target node, the initiator node configures or updates the memory address map of the initiator node during runtime, and notifies the configured or updated memory address map of the initiator node to an operating system, wherein: the initiator node comprises a central processing complex having a plurality of cores; the target node comprises a fabric memory expander; the volatile memory comprises a volatile memory DIMM; and the non-volatile memory comprises a non-volatile memory DIMM.

In example 6, the subject matter of example 1 may include that the initiator node prioritizes memory access requests for I/O requests.

In example 7, the subject matter of example 1 may include that different opcodes corresponding to different patterns in data are used for communication between the initiator node and the target node.

In example 8, the subject matter of example 1 may include that a selected opcode is used for indicating compressed data for communication between the initiator node and the target node.

Example 9 is a system for accessing memory. The system comprises an initiator node; a target node coupled to the initiator node; a memory coupled to the target node, wherein the initiator node is configurable to: communicate with the target node that is coupled to the memory; generate, at system initialization time, a memory address map of the initiator node to include addresses corresponding to the memory to which the target node is coupled; and access the memory coupled to the target node, by using the memory address map of the initiator node.

In example 10, the subject matter of example 9 may include that the memory that is coupled to the target node includes at least one of a volatile memory and a non-volatile memory.

In example 11, the subject matter of example 10 may include that the volatile memory and the non-volatile memory are included in one or more dual inline memory module (DIMM) devices, wherein the addresses corresponding to the memory to which the target node is coupled comprises DIMM device physical addresses, and wherein the initiator node is further configurable to: in response to receiving a request for accessing a system physical address of the initiator node from a core or input/output (I/O) device, convert, the system physical address to a DIMM device physical address; convert the DIMM device physical address to a system physical address of the target node; and send a message to the target node to access the system physical address of the target node, in response to converting the DIMM device physical address to the system physical address of the target node.

In example 12, the subject matter of example 11 may include that the initiator node is further configurable to: receive, a response from the target node, wherein the response from the target node is based on accessing the one or more DIMM devices via the system physical address sent to the target node; and forward the response to the core or the I/O device from which the request for accessing the system physical address was received.

In example 13, the subject matter of example 10 may include that in response to a hot plugging of the target node, the initiator node is operable to perform operations to configure or update the memory address map of the initiator node during runtime, and notify the configured or updated memory address map of the initiator node to an operating system, wherein: the initiator node comprises a central processing complex having a plurality of cores; the target node comprises a fabric memory expander; the volatile memory comprises a volatile memory DIMM; and the non-volatile memory comprises a non-volatile memory DIMM.

In example 14, the subject matter of example 9 may include that the initiator node prioritizes memory access requests for I/O requests.

In example 15, the subject matter of example 9 may include that different opcodes corresponding to different patterns in data are used for communication between the initiator node and the target node.

In example 16, the subject matter of example 9 may include that a selected opcode is used for indicating compressed data for communication between the initiator node and the target node.

Example 17 is a system for accessing memory. The system comprises a display; an initiator node coupled to display; a target node coupled to the initiator node; and a memory coupled to the target node, wherein the initiator node is configurable to: communicate with the target node that is coupled to the memory; generate, at system initialization time, a memory address map of the initiator node to include addresses corresponding to the memory to which the target node is coupled; and access the memory coupled to the target node, by using the memory address map of the initiator node.

In example 18, the subject matter of example 17 may include that the memory that is coupled to the target node includes at least one of a volatile memory and a non-volatile memory.

In example 19, the subject matter of example 18 may include that volatile and the non-volatile memory are included in one or more dual inline memory module (DIMM) devices, wherein the addresses corresponding to the memory to which the target node is coupled comprises DIMM device physical addresses, and wherein the initiator node is further configurable to: in response to receiving a request for accessing a system physical address of the initiator node from a core or input/output (I/O) device, convert, the system physical address to a DIMM device physical address; convert the DIMM device physical address to a system physical address of the target node; and send a message to the target node to access the system physical address of the target node, in response to converting the DIMM device physical address to the system physical address of the target node.

In example 20, the subject matter of example 19 may include that the initiator node is further configurable to: receive, a response from the target node, wherein the response from the target node is based on accessing the one or more DIMM devices via the system physical address sent to the target node; and forward the response to the core or the I/O device from which the request for accessing the system physical address was received.

In example 21, the subject matter of example 18 may include that in response to a hot plugging of the target node, the initiator node is operable to perform operations to configure or update the memory address map of the initiator node during runtime, and notify the configured or updated memory address map of the initiator node to an operating system, wherein: the initiator node comprises a central processing complex having a plurality of cores; the target node comprises a fabric memory expander; the volatile memory comprises a volatile memory DIMM; and the non-volatile memory comprises a non-volatile memory DIMM.

In example 22, the subject matter of example 17 further includes that the initiator node prioritizes memory access requests for I/O requests.

In example 23, the subject matter of example 17 further includes that different opcodes corresponding to different patterns in data are used for communication between the initiator node and the target node.

In example 24, the subject matter of example 17 further includes that a selected opcode is used for indicating compressed data for communication between the initiator node and the target node.

Example 25 is a system for accessing memory, wherein the systems includes: means for configuring an initiator node to communicate with a target node that is coupled to a memory; means for generating, at system initialization time, a memory address map of the initiator node to include addresses corresponding to the memory to which the target node is coupled; and means for accessing, by the initiator node, the memory coupled to the target node, by using the memory address map of the initiator node.

What is claimed is:

1. A method, comprising:

configuring an initiator node to communicate with a target node that is coupled to a memory included in one or more dual inline memory modules (DIMM) devices, wherein addresses corresponding to the memory comprises DIMM device physical addresses; and in response to receiving a request, by the initiator node, for accessing a system physical address of the initiator node, performing, by the initiator node, operations comprising:

converting the system physical address of the initiator node to a DIMM device physical address and subsequently converting the DIMM device physical address to a system physical address of the target node; and sending a message to the target node to access the system physical address of the target node, in response to converting the DIMM device physical address to the system physical address of the target node.

2. The method of claim 1, the method further comprising:

receiving, by the initiator node, a response from the target node, wherein the response from the target node is based on accessing the one or more DIMM devices via the system physical address of the target node sent to the target node; and forwarding, by the initiator node, the response to an entity from which the request for accessing the system physical address of the initiator node was received.

3. The method of claim 1, wherein in response to a hot plugging of the target node, the initiator node configures or updates a memory address map of the initiator node during runtime, and notifies the configured or updated memory address map of the initiator node to an operating system, and wherein:

the initiator node comprises a central processing complex having a plurality of cores; and the target node comprises a fabric memory expander.

4. The method of claim 1, wherein the initiator node prioritizes memory access requests over I/O requests.

5. The method of claim 1, wherein different opcodes corresponding to different patterns in data are used for communication between the initiator node and the target node, wherein an opcode is a portion of a machine language instruction that specifies an operation to be performed in association with an operand that specifies data to be processed.

6. The method of claim 1, wherein a selected opcode is used for indicating compressed data for communication between the initiator node and the target node, wherein the selected opcode is a portion of a machine language instruction that specifies an operation to be performed in association with an operand that specifies data to be processed.

7. An apparatus, comprising:

an initiator node;

a target node coupled to the initiator node;

a memory coupled to the target node, wherein the initiator node is configurable to:

communicate with the target node that is coupled to the memory, wherein the memory is included in one or more dual inline memory modules (DIMM) devices, and wherein addresses corresponding to the memory comprises DIMM device physical addresses;

in response to receiving a request, by the initiator node, for accessing a system physical address of the initiator node, convert the system physical address of the initiator node to a DIMM device physical address and subsequently convert the DIMM device physical address to a system physical address of the target node; and send a message to the target node to access the system physical address of the target node, in response to converting the DIMM device physical address to the system physical address of the target node.

8. The apparatus of claim 7, wherein the initiator node is further configurable to:

receive, a response from the target node, wherein the response from the target node is based on accessing the one or more DIMM devices via the system physical address of the target node sent to the target node; and forward the response to an entity from which the request for accessing the system physical address of the initiator node was received.

9. The apparatus of claim 7, wherein in response to a hot plugging of the target node, the initiator node is operable to perform operations to configure or update a memory address map of the initiator node during runtime, and notify the configured or updated memory address map of the initiator node to an operating system, and wherein:

the initiator node comprises a central processing complex having a plurality of cores; and the target node comprises a fabric memory expander.

10. The apparatus of claim 7, wherein the initiator node prioritizes memory access requests over I/O requests.

11. The apparatus of claim 7, wherein different opcodes corresponding to different patterns in data are used for communication between the initiator node and the target node, wherein an opcode is a portion of a machine language instruction that specifies an operation to be performed in association with an operand that specifies data to be processed.

12. The apparatus of claim 7, wherein a selected opcode is used for indicating compressed data for communication between the initiator node and the target node, wherein the selected opcode is a portion of a machine language instruction that specifies an operation to be performed in association with an operand that specifies data to be processed.

13. A system, comprising:

a display;

an initiator node coupled to display;

a target node coupled to the initiator node; and a memory coupled to the target node, wherein the initiator node is configurable to:

communicate with the target node that is coupled to the memory, wherein the memory is included in one or more dual inline memory modules (DIMM) devices, and wherein addresses corresponding to the memory comprises DIMM device physical addresses;

in response to receiving a request, by the initiator node, for accessing a system physical address of the initiator node, convert the system physical address of the initiator node to a DIMM device physical address and subsequently convert the DIMM device physical address to a system physical address of the target node; and send a message to the target node to access the system physical address of the target node, in response to converting the DIMM device physical address to the system physical address of the target node.

14. The system of claim 13, wherein the initiator node is further configurable to:

receive, a response from the target node, wherein the response from the target node is based on accessing the one or more DIMM devices via the system physical address of the target node sent to the target node; and forward the response to an entity from which the request for accessing the system physical address of the initiator node was received.

15. The system of claim 13, wherein in response to a hot plugging of the target node, the initiator node is operable to perform operations to configure or update a memory address map of the initiator node during runtime, and notify the configured or updated memory address map of the initiator node to an operating system, and wherein:

the initiator node comprises a central processing complex having a plurality of cores; and the target node comprises a fabric memory expander.

16. The system of claim 13, wherein the initiator node prioritizes memory access requests over I/O requests.

17. The system of claim 13, wherein different opcodes corresponding to different patterns in data are used for communication between the initiator node and the target node, wherein an opcode is a portion of a machine language instruction that specifies an operation to be performed in association with an operand that specifies data to be processed.

18. The system of claim 13, wherein a selected opcode is used for indicating compressed data for communication between the initiator node and the target node, wherein an opcode is a portion of a machine language instruction that specifies an operation to be performed in association with an operand that specifies data to be processed.

* * * * *